US006250954B1

(12) United States Patent
Kasai

(10) Patent No.: US 6,250,954 B1
(45) Date of Patent: Jun. 26, 2001

(54) ELECTRICAL CONNECTION BOX

(75) Inventor: Koji Kasai, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/390,424

(22) Filed: Sep. 3, 1999

(30) Foreign Application Priority Data

Sep. 7, 1998 (JP) ........................................ 10-252875

(51) Int. Cl.[7] ...................... H01R 13/72; H01R 13/60; H01B 3/00; H02G 3/00

(52) U.S. Cl. ...................... 439/501; 439/527; 174/72 A

(58) Field of Search ...................... 174/72 A; 439/719, 439/501, 527, 374

(56) References Cited

U.S. PATENT DOCUMENTS

| | | | |
|---|---|---|---|
| 4,772,213 * | 9/1988 | Bell et al. | 439/135 |
| 5,219,302 * | 6/1993 | Robertson et al. | 439/404 |
| 5,483,409 * | 1/1996 | Heidorn et al. | 361/119 |
| 5,730,617 | 3/1998 | Araki et al. . | |

FOREIGN PATENT DOCUMENTS 0782216 2/1997 (EP) .

OTHER PUBLICATIONS

European Search Report #EP 99 11 7423 Patent Abstracts of Japan, Publication #10080040, Publication date: Mar. 24, 1998.

Patent Abstracts of Japan, Publication #08242518, Publication date: Sep. 17, 1996.

Abstract Zus ammenfassung/Abrege XS 9911742310 MA.

* cited by examiner

*Primary Examiner*—Paula Bradley
*Assistant Examiner*—James Harvey
(74) *Attorney, Agent, or Firm*—Bierman, Muserlian and Lucas

(57) ABSTRACT

An electrical connection box which includes a main unit, having a mounting surface thereon, and a circuit unit having a bottom surface complementary to the mounting surface. The circuit unit is mounted on the main unit with the bottom surface facing the mounting surface. A holder is provided on a side surface next to the mounting surface and is attached by a plurality of attachment sections. There is a stop member on the mounting surface spaced apart from and adjacent the holder, forming an insertion space therebetween. This permits the wire harness to extend through the insertion space to the exterior of the unit. It prevents the harness from entering upon the mounting surface and being trapped there. It also makes it easier to draw the wire harness out of the connection box. In a preferred form of the Invention, there is a retainer on the holder (preferably arcuate) which is spaced apart from the side surface and provides additional space for maneuvering the wire harness. This facilitates both insertion and assembly, and also minimizes breakage of or damage to the wire harness.

14 Claims, 12 Drawing Sheets

ELECTRICAL CONNECTION BOX

This Application claims the benefit of the priority of Japanese Application 10-252875, filed Sep. 7, 1998.

The present Invention is directed to an improved electrical connection box for electrical and electronic components, such as fuses, relays, junctions, etc. It is intended primarily for mounting in an automobile.

BACKGROUND OF THE INVENTION

Electrical connection boxes of the type described herein hold various electronic circuits and components, and also serve as branching points for wire harnesses.

Referring to FIGS. 8 to 12, main unit 41 of the electrical connection box includes mounting surface 43 on upper surface 42. Positioning sections 44 are located at the four corners of mounting surface 43. Engagement locks 45, spaced apart from each other, are adjacent side surface 52 and between two positioning sections 44. They project from mounting surface 43, as does male connector 46.

Circuit unit 47 is provided with bottom surface 48 which corresponds to mounting surface 43. A female conductor (not shown) projects from bottom surface 48 and mates with male connector 46. One of cassette locks 51 projects from each of side surfaces 50. These cassette locks fit with engagement locks 45 to secure circuit unit 47 to main unit 41. In this position, male connector 46 is engaged by the female connector of circuit unit 47 to form an electrical connection.

Engagement locks 53 are spaced apart from each other and project toward engagement lock 45 of main unit 41. Holder 54 comprises main unit attachment section 55 and connector attachment section 56. Attachment section side surface 58 of attachment section 55 is a flat surface and two cassette locks 59, spaced apart from each other, project from the side surface. The upper end of side surface 58 is at the same height as the upper ends of cassette locks 59. When cassette locks 59 are within engagement. locks 53, thereby retaining holder 54 on main unit 41, insertion space A is formed between main unit 41 and holder 54 by side surface 52, engagement lock 53, side surface 58, and cassette lock 59. Opening 61 is located at the center of connector attachment section 56.

Diagnosis connector 60 includes a plurality of connection terminals 62 at the lower end thereof. When the diagnosis connector is in place, connector terminals 62 are in electrical contact with wire harness 63. Wire harness 63 passes through insertion space A and extends out in the direction of circuit unit 47.

Due to the construction of positioning sections 44 and engagement locks 45, it is possible for portions of wire harness 63, having been passed through insertion space A and extended out toward circuit unit 47, to stray onto mounting surface 43.

This is particularly shown in FIGS. 8 and 10. If circuit unit 47 is then mounted on main unit 41, those portions of wire harness 63 which are on mounting surface 43 will be trapped between circuit unit 47 and main unit 41 or between circuit unit 47 and engagement lock 45. This may interfere with the electrical connection between circuit unit 47 and main unit 41; in addition, this malfunction can cause the application of excessive force to wire harness 63, resulting in distortion or even breakage thereof.

Moreover, side surface 58 of holder 54 is usually flat, making insertion space A very narrow. When the harness is extended through insertion space A, there will be a tendency to cause the harness to bend in an unforeseeable direction. As a result, it becomes difficult to draw out wire harness 63 when completing the connection. Therefore, there is a need to restrict the wire harness so that it will not move onto mounting surface 43.

SUMMARY OF THE INVENTION

It is, therefore, an object of the present Invention to provide an electrical connection box wherein the circuit unit and the main unit can be reliably fitted together and interconnected, which also reduces the risk of breakage and permits the wire harness to be easily withdrawn from the connection box.

In practicing the Invention, there is provided an electrical connection box made up of a main unit and a circuit unit. The former has a mounting surface thereon, while the latter is provided with a bottom surface complementary to the mounting surface. The circuit unit is mounted on the main unit with the bottom surface facing the mounting surface.

There is also provided a holder, mounted on a side surface, adjacent the mounting surface. It is retained in position by a plurality of attachment sections which engage a corresponding plurality of engagement sections on the side surface. The holder includes a connector adapted for electrical contact with the wire harness.

There is a stop member on the mounting surface which is spaced apart from and adjacent the holder. This forms an insertion space between the holder and the stop member. The insertion space permits the wire harness to pass therethrough to an exterior of the main unit and prevents it from wandering onto the mounting surface.

The stop member is advantageously a flat plate and extends between the engagement sections on the mounting surface. It has been found desirable that the stop member and the engagement sections on the mounting surface be of substantially equal height. In this manner, the wire harness is restrained and prevented from straying onto the mounting surface and being trapped between the mounting surface and the bottom surface.

In a preferred form of the device, there is a retaining section on the holder which extends between the attachment sections; this permits the wire harness to pass over the retaining section. In a preferred form of the device, the retaining section has an offset section which is of lesser height than the attachment sections from which it extends. As a result, passage of the wire harness over the offset section is facilitated.

In a more preferred form of the Invention, the retaining section is an arcuate section which bows in a direction away from the main unit. As a result, the insertion space between the stop member and the retaining member is provided. As an alternative construction, the lower portion of the stop member can be left open, since the wire harness is usually sufficiently restrained by the upper portion of the stop member.

BRIEF DESCRIPTION OF THE DRAWINGS

In the accompanying drawings, constituting a part hereof, and in which like reference characters indicate like parts.

DETAILED DESCRIPTION OF THE INVENTION

Figure 1:
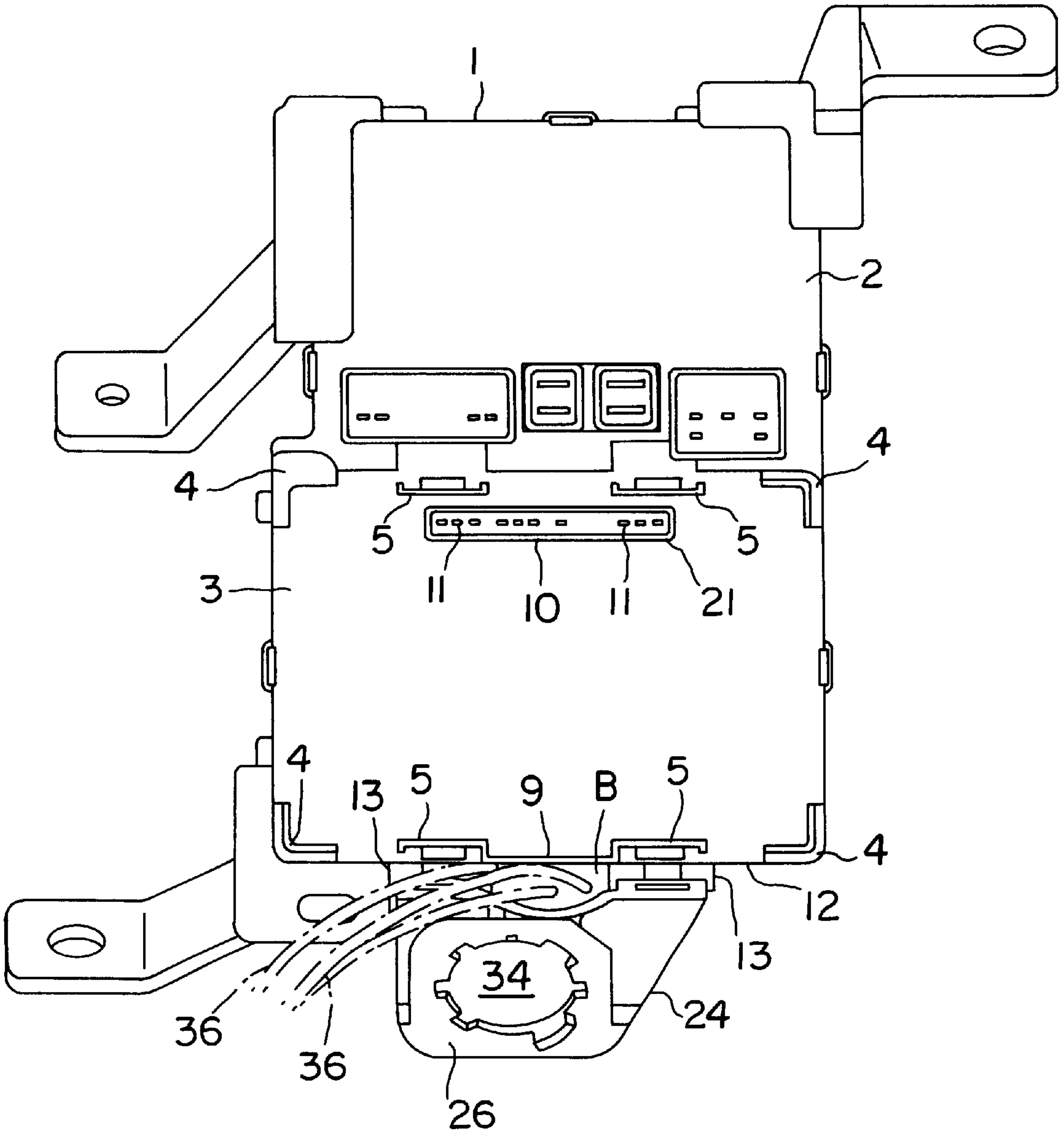
FIG. 1 is a plan view of the electrical connection box of the present Invention.
Figure 2:
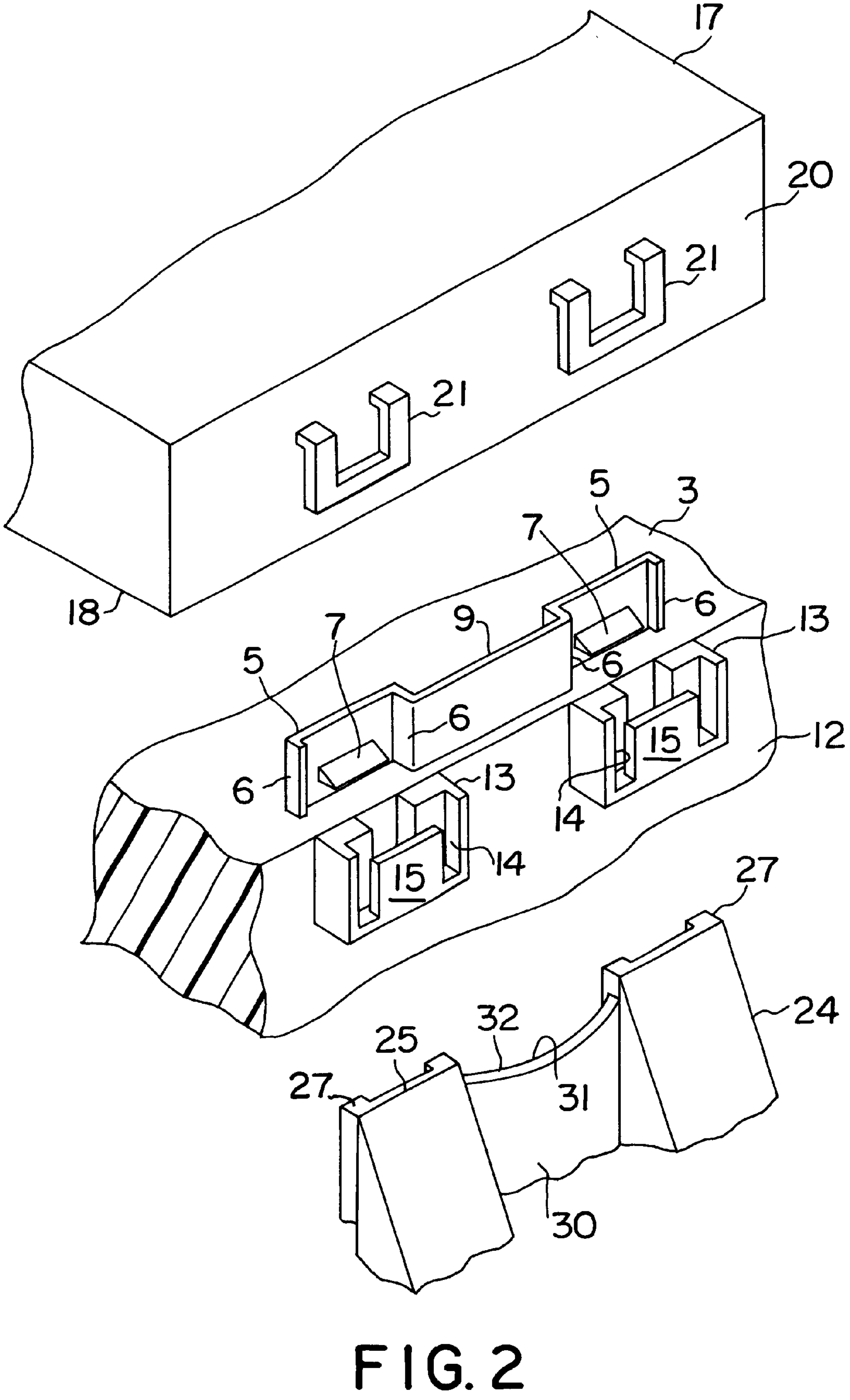
FIG. 2 is a fragmentary perspective exploded view of the circuit unit, main unit, and holder.
Figure 3:
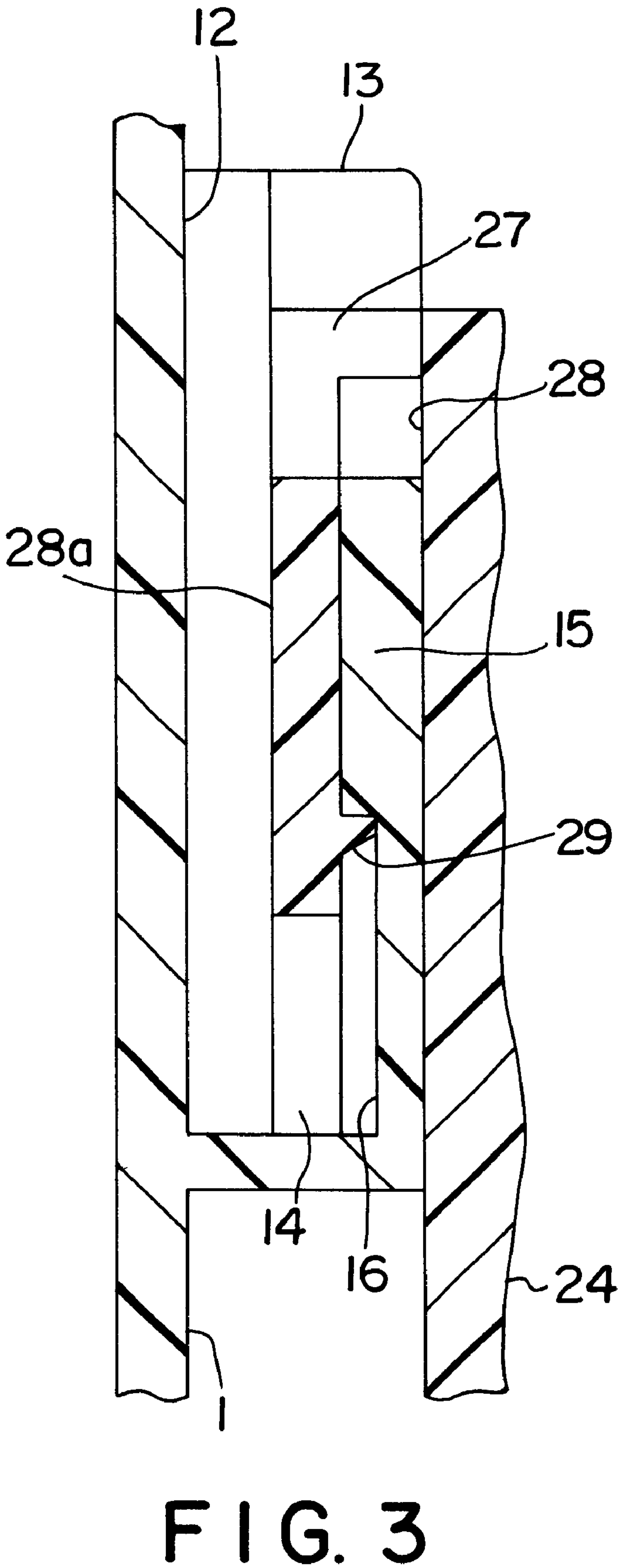
FIG. 3 is a cross-section of the engagement lock and cassette lock.
Figure 4:
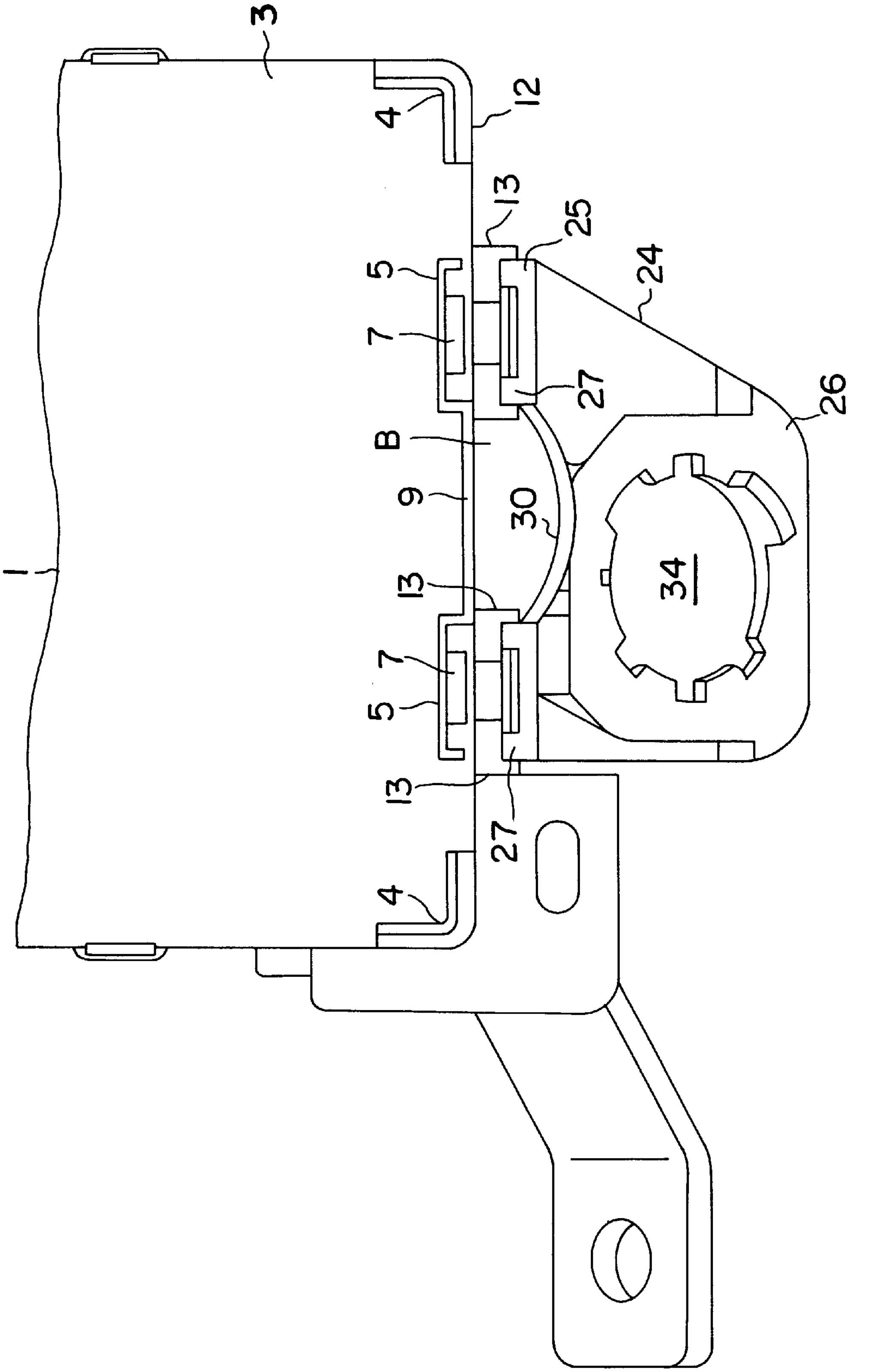
FIG. 4 is an enlarged schematic drawing of the electrical connection box of the present Invention.
Figure 5:
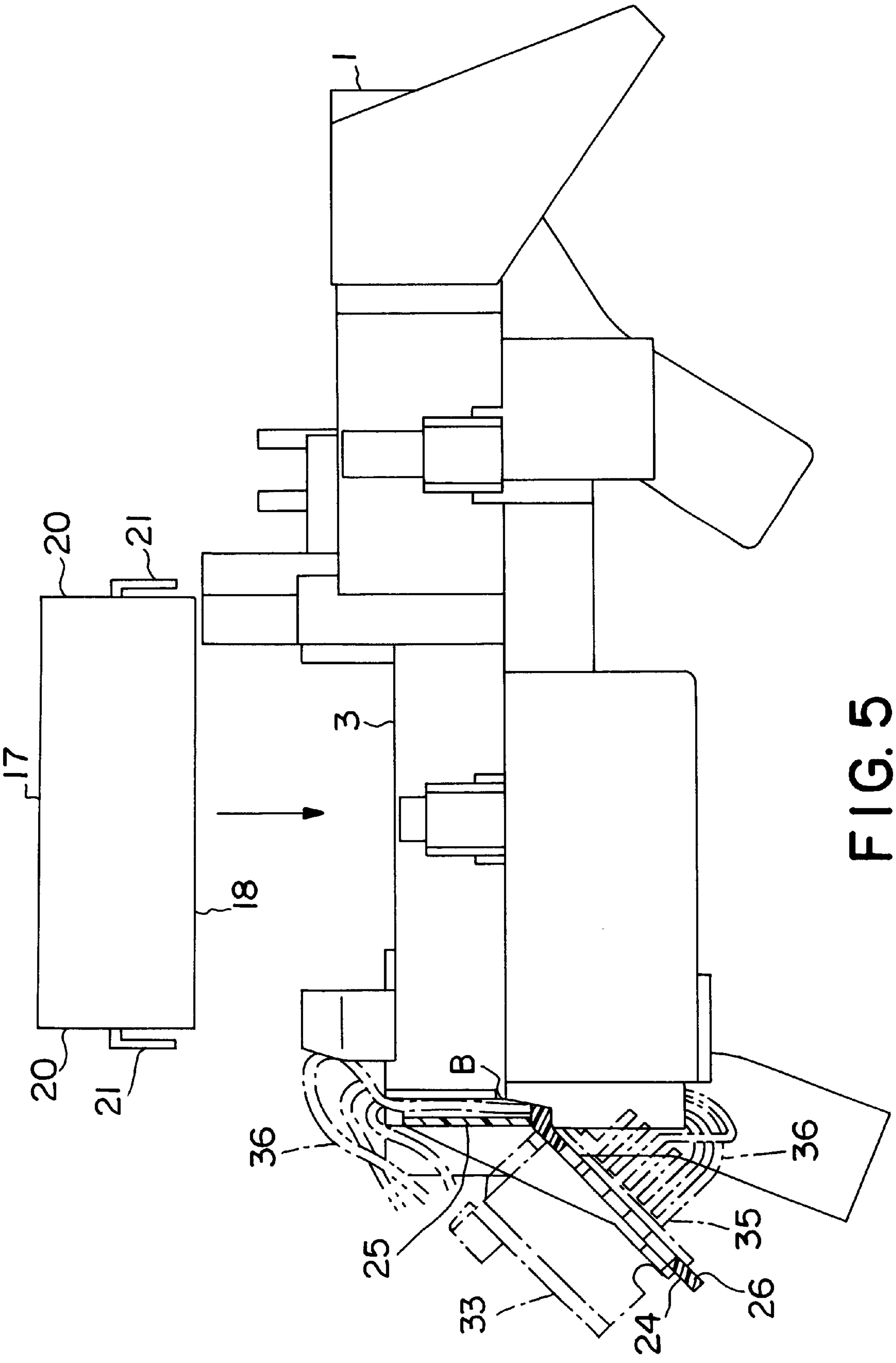
FIG. 5 is a side view of the device as shown in FIG. 4.
Figure 6:
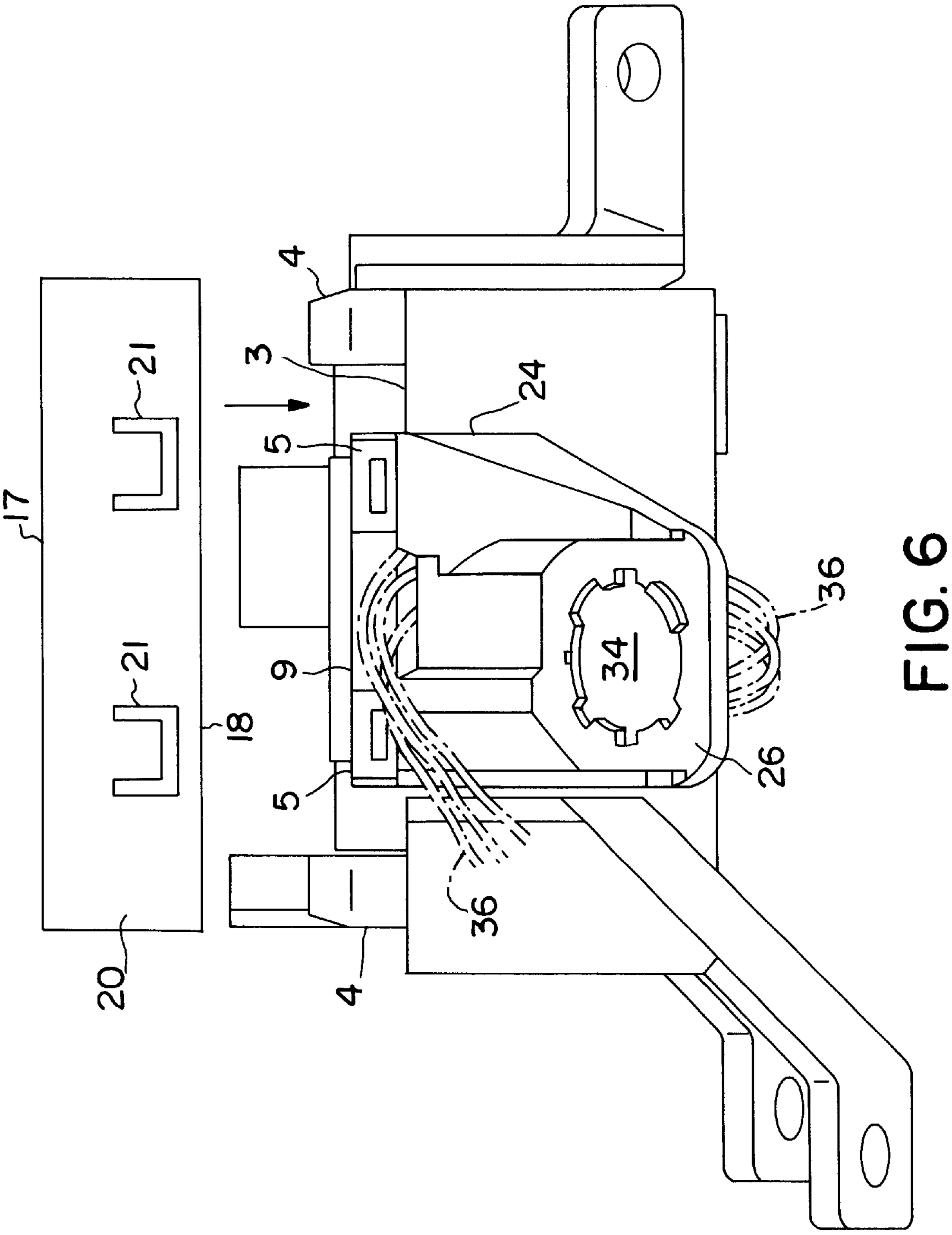
FIG. 6 is a front view of the device of FIG. 4.
Figure 7:
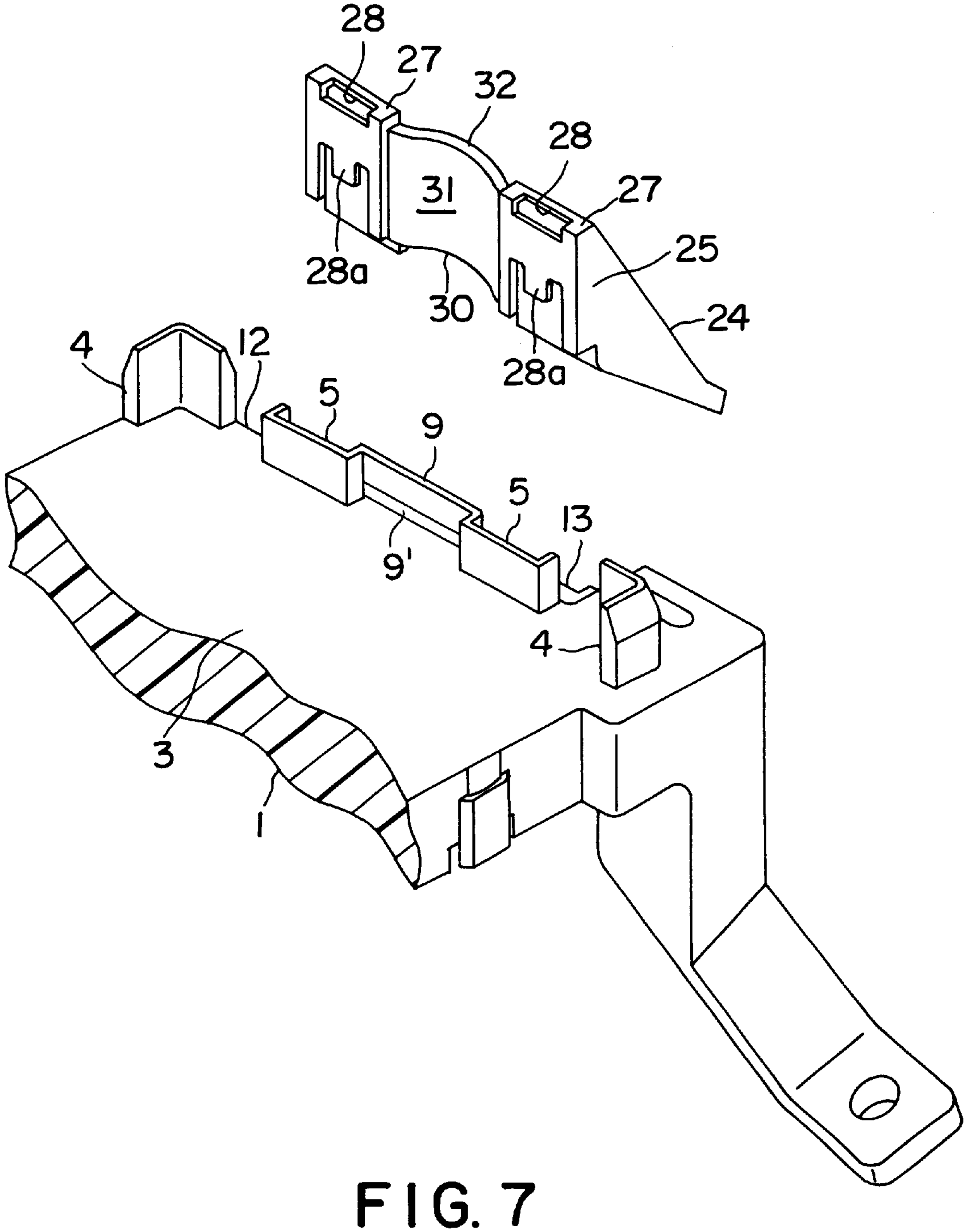
FIG. 7 is an enlarged fragmentary view of the holder and main box.
Figure 8:
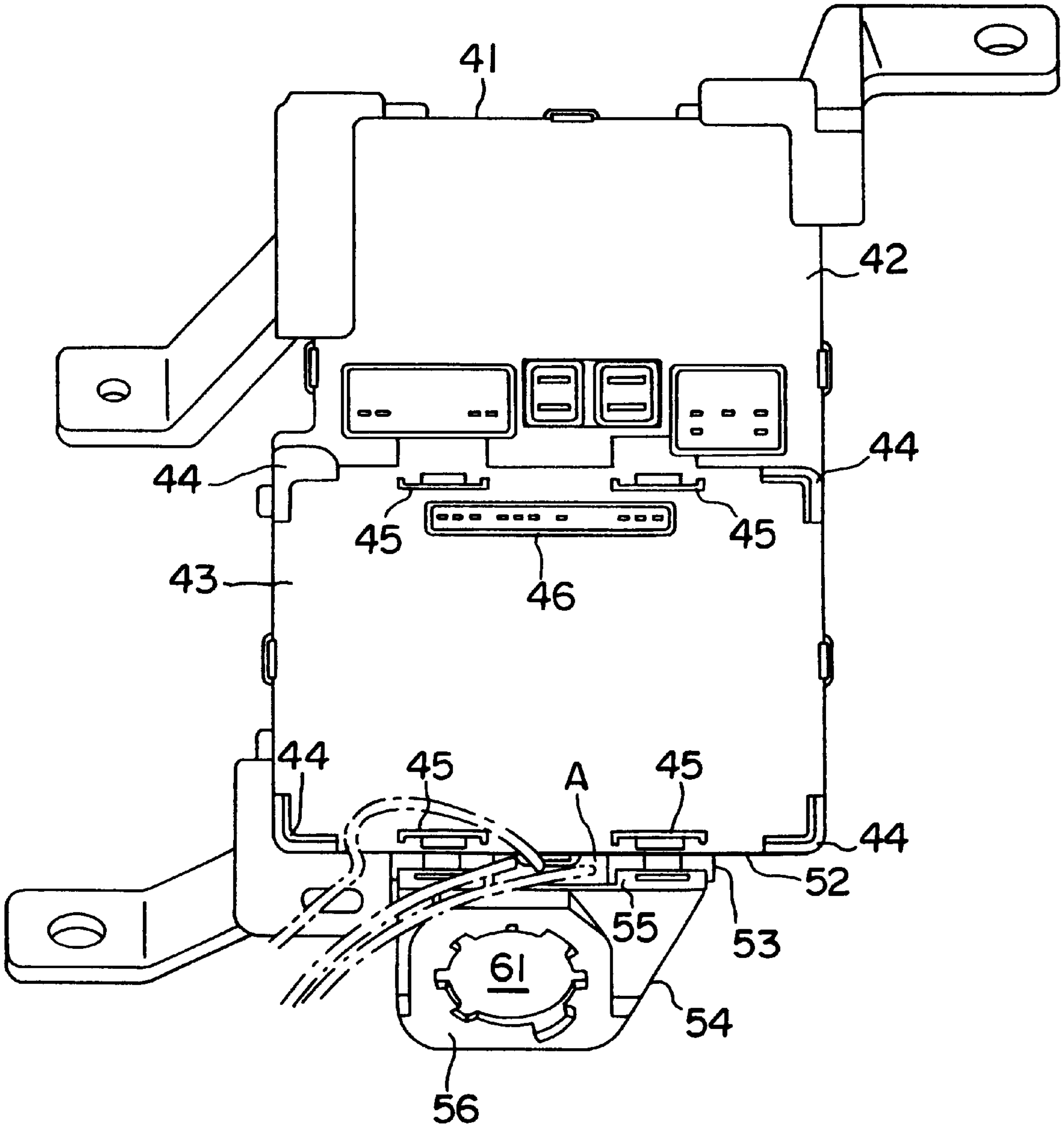
FIG. 8 PRIOR ART
FIG. 8 is a view, similar to that of FIG. 1, of a prior art electrical connection box.
Figure 9:
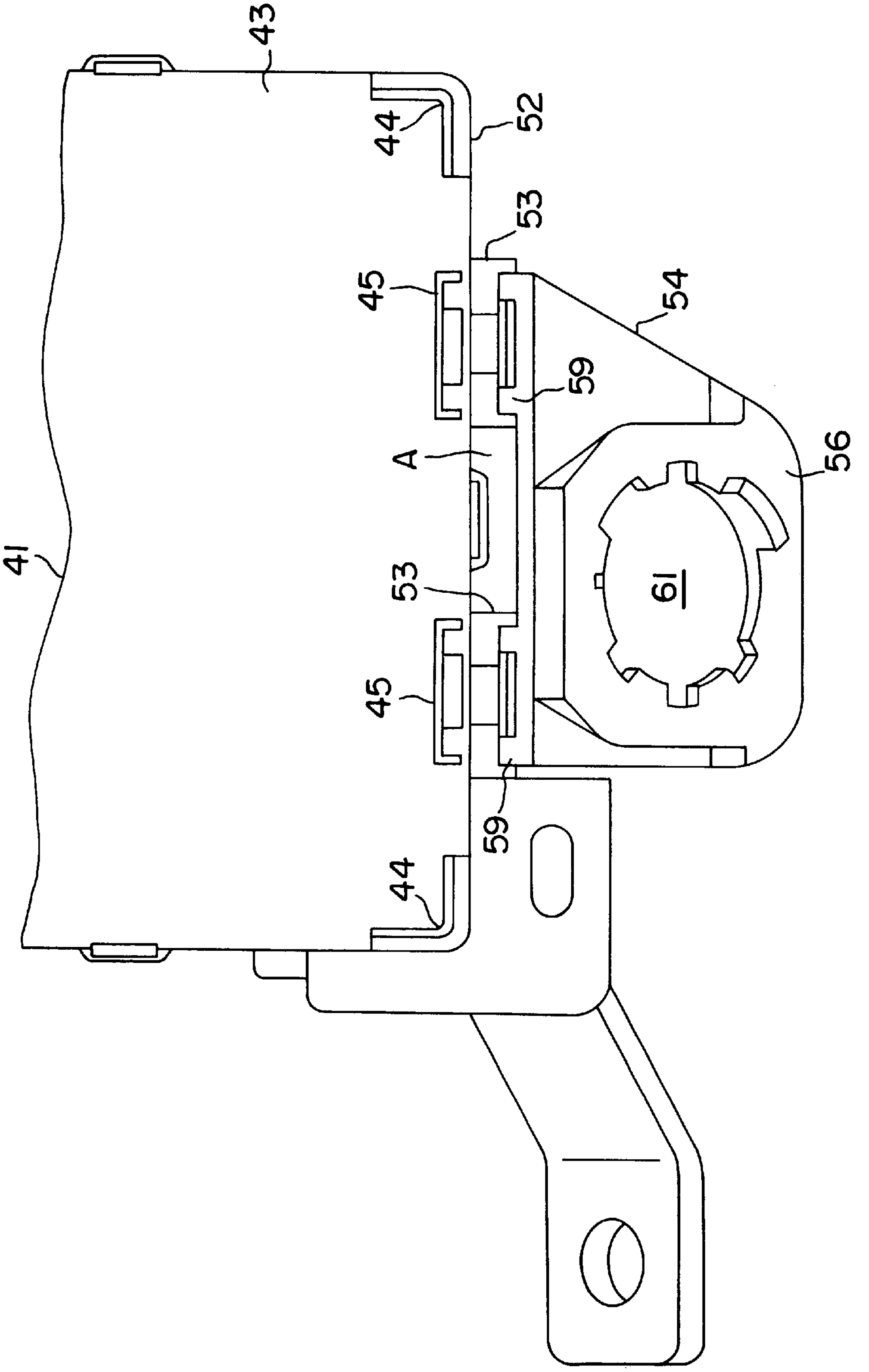
FIG. 9 PRIOR ART
FIG. 9 is a view, similar to that of FIG. 4, of the electrical connection box of the prior art.
Figure 10:
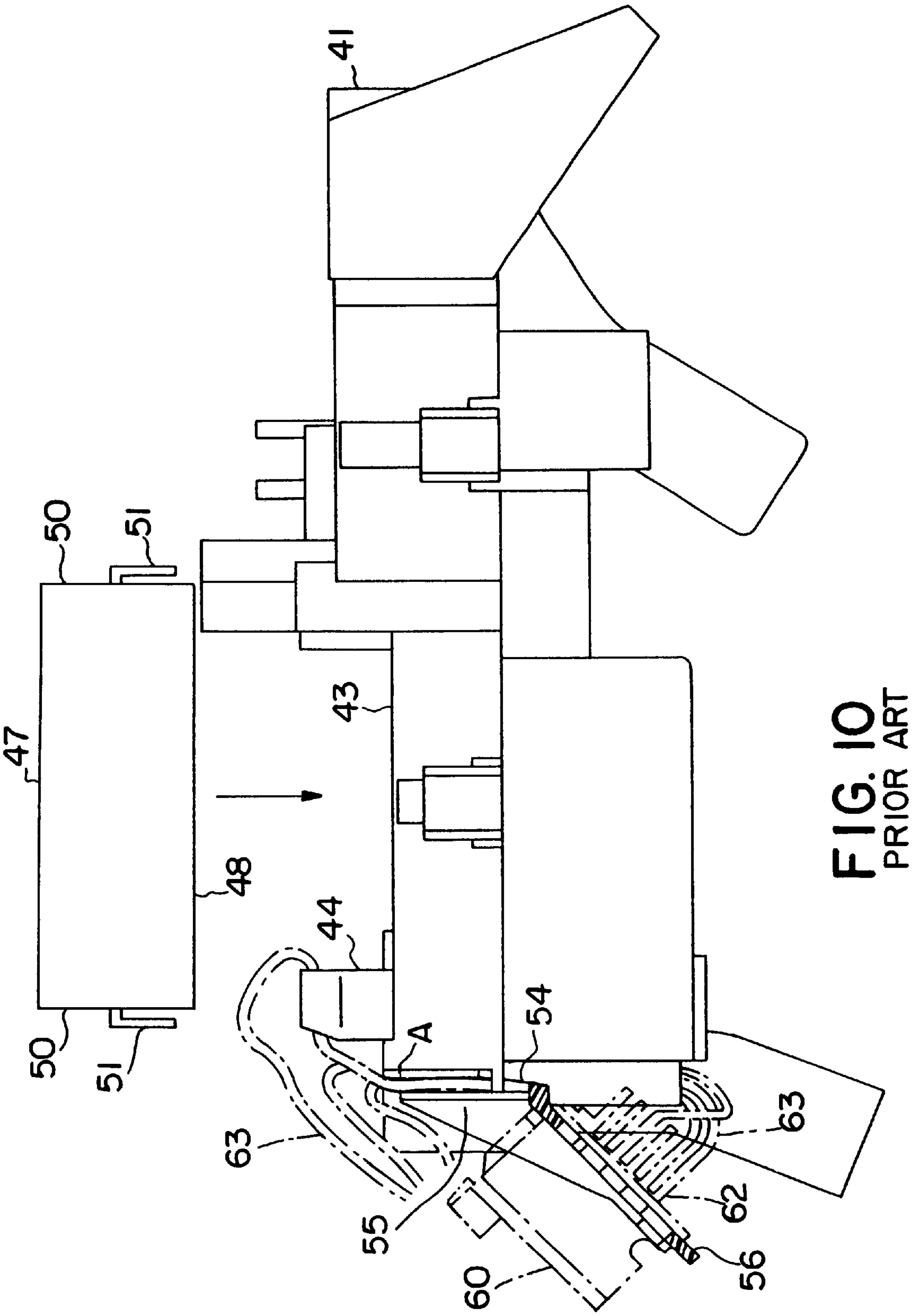
FIG. 10 PRIOR ART
FIG. 10 is a view, similar to that of FIG. 5, of the prior art connection box.
Figure 11:
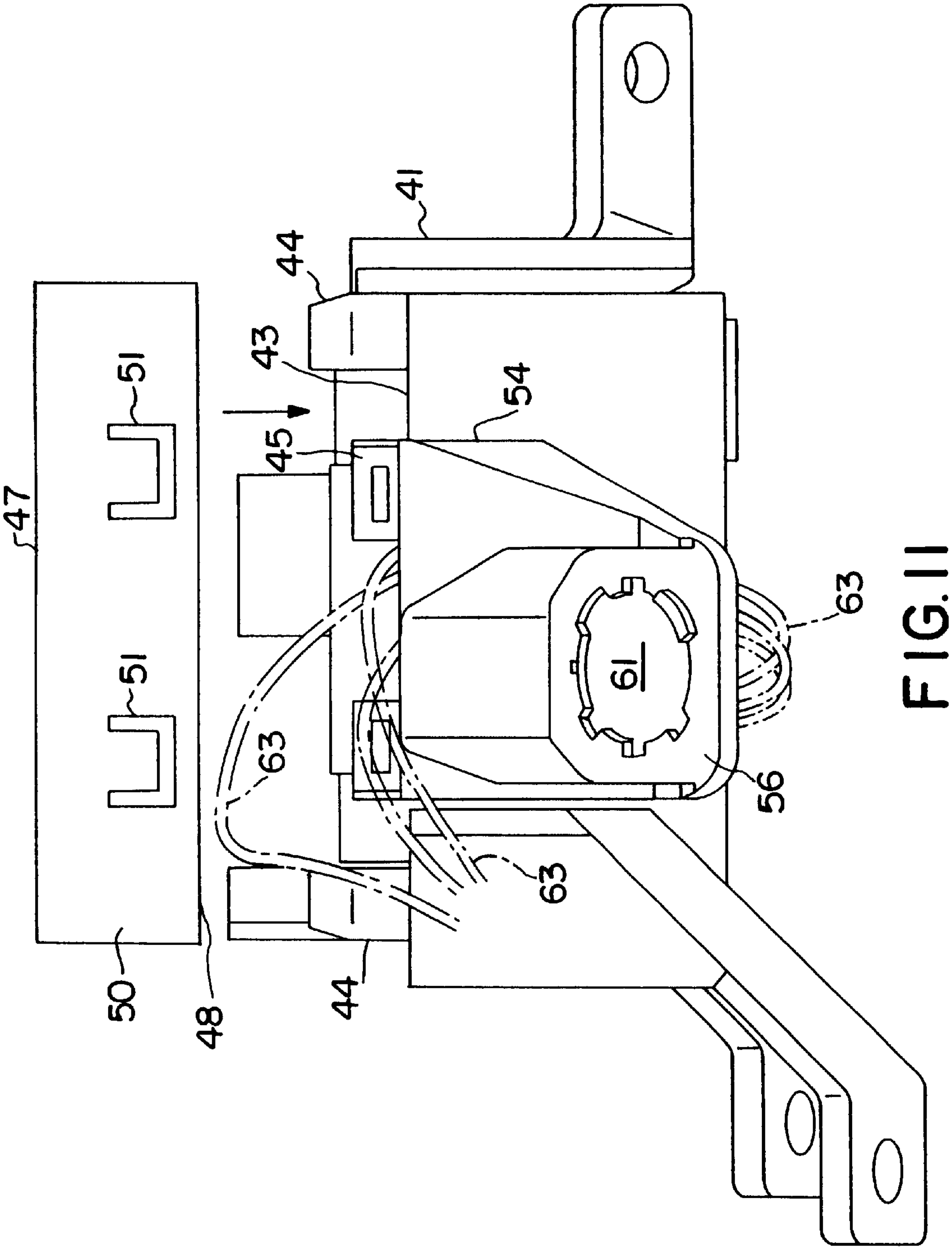
FIG. 11 PRIOR ART
FIG. 11 is a view, similar to that of FIG. 6, of the prior art connection box.
Figure 12:
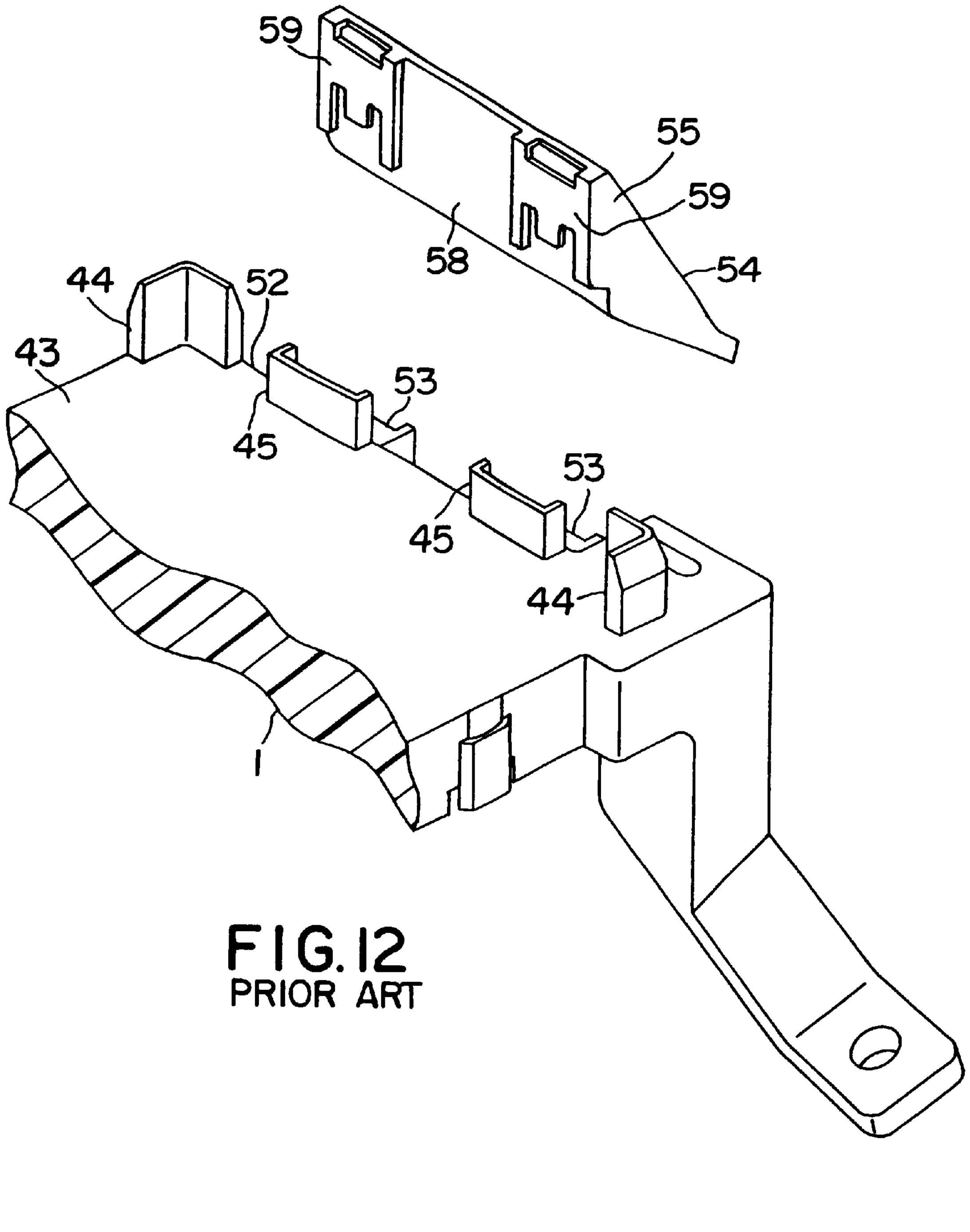
FIG. 12 PRIOR ART
FIG. 12 is a view, similar to that of FIG. 7, of the prior art connection box.

The present Invention is shown in FIGS. 1 to 7. Electrical connection box main unit 1 includes mounting surface 3 on upper surface 2 which allows circuit unit 17 to be located thereon. Positioning sections 4 are placed at each of the corners of mounting surface 3 and project therefrom. Two engagement locks 5, separated from each other, project between a pair of opposing positioning sections 4.

Engagement locks 5 each comprise a pair of guide sections 6 on either side of engagement projection 7. Stop 9 extends between and continous with engagement locks 5 and projects toward side surface 12 of main unit 1. Stop 9 is a plate with its upper edge at the same height as that of the upper ends of engagement locks 5. Male connector 10 projects from upper surface 2 and contains a plurality of terminals 11.

Engagement locks 13 are spaced apart from each other and project from side surface 12 in the direction of stop 9. Fitting cavities 14 are at the centers of engagement locks 13 and engagement projection 15 is at the center of fitting cavity 14. Engagement cavity 16 is on the inner surface of engagement projection 15.

Circuit unit 17 is provided with bottom surface 18 which is complementary to mounting surface 3. Male connector 10 projects from mounting surface 3 and is adapted to receive a female conductor (not shown) which projects from bottom surface 18 of circuit unit 17. Cassette locks 21 are spaced apart from each other and project from each of two opposing side surfaces 20 of circuit unit 17. When circuit unit 17 is mounted on mounting surface 3, cassette locks 21 and engagement locks 5 interlock to retain circuit unit 17 on main unit 1. In this position, male connector 10 and the female connector projecting from bottom surface 18 are in electrical contact.

Holder 24 includes main unit attachment sections 25 and connector attachment section 26. The attachment sections desirably are two cassette locks 27 spaced apart from each other at the upper ends of the main unit attachment sections. Engagement projections 28*a* are on the outside of insertion openings 28 and engagement claw 29 is on the inner surface of the lower section of engagement projection 28*a*. Cassette locks 27 are inserted into fitting cavities 14 and engagement projection 15 on side surface 12 of main unit 1 is introduced into insertion opening 28, whereby engagement claw 29 fits into engagement cavity 16, thereby mounting holder 24 and retaining it on main unit 1.

In a preferred form of the Invention, arcuate section 30 extends between cassette locks 27 of holder 24. Arcuate section 30 bows in the direction away from side surface 12 of main unit 1. When cassette locks 27 engage engagement locks 13, holder 24 is mounted on main unit 1. This forms insertion space B between main unit 1 and holder 24 by side surface 12, engagement locks 13, arcuate section 30, and cassette locks 27. As a result, the distance between side surface 12 and arcuate section 30 is larger than the distance between side surface 52 and main unit 41 and attachment section 58 of the prior art devices of this type.

It has been found desirable that the upper end of arcuate section 30 is lower than the upper ends of cassette locks 27, thereby forming offset section 32. The space created by offset section 32 facilitates the passage of wire harness 36 thereover.

Opening 34 is formed at the center of attachment section 26. Diagnosis connector 33, having a plurality of connection terminals 35, is inserted into opening 34. Terminals 35 form an electrical connection with wire harness 36 and the latter passes through insertion space B and extends out through the side of circuit unit 17. Due to the presence of holder 24, cassette lock 27, offset section 32, wire harness 36, when inserted, will be constrained to extend only over offset section 32 of holder 24. In other words, in this embodiment of the Invention, the distance between side surface 12 and bent surface 31 is greater than the distance between main unit side surface 52 and attachment section side surface 58 of holder 54 of the prior art. Insertion space B is greater than insertion space A.

This provides a greater degree of freedom for wire harness 36 and prevents the wire harness from entering mounting surface 3. Moreover, wire harness 36 can easily be drawn out of the connection box. The passage of wire harness 36 over offset section 32 restricts it at one point within a narrow range which contributes to the ease of withdrawing the wire harness.

Although only certain embodiments of the present Invention have been expressly described, such modifications as would be apparent to the person of ordinary skill may be made without departing from the scope or spirit thereof. For example, the upper end of stop 9 can be higher than the upper ends of the corresponding engagement locks. Engagement locks 5 could be interposed between a different pair of positioning sections 4 from that actually depicted. Stop 9 would, in such a case, cut across positioning sections 4 formed on side surface 12.

The shape of arcuate section 30 could be varied, so long as the inner surface of the retaining surface is spaced apart from side surface 12. The upper edge of offset section 32 is shown as being flat. Alternatively, it could be arched in either direction. The number of engagement locks 5 is not critical and could be varied.

In a further modification, the retaining section on the holder could have an opening at its lower section. This would provide additional space between the holder and side surface 12, thus increasing the freedom for wire harness 36. The foregoing modifications would produce substantially the same advantages as the forms of the Invention expressly disclosed.

Although only a limited number of embodiments of the present Invention has been expressly disclosed, it is, nonetheless, to be broadly construed and not to be limited except by the character of the claims appended hereto.

What I claim is:

1. An electrical connection box comprising a main unit, having a mounting surface thereon, and a circuit unit having a bottom surface, said bottom surface being substantially complementary to said mounting surface, said circuit unit adapted to be mounted on said main unit with said bottom surface facing said mounting surface, a holder, mounted on a side surface of said main unit adjacent said mounting surface by a plurality of first attachment sections, said first attachment sections engageable with a corresponding plurality of first engagement sections on said side surface of said main unit, said holder comprising a connector adapted for electrical contact with a wire harness, a pair of second engagement sections extending upward from said mounting surface and adjacent to said side surface of said main unit;

a pair of second attachment sections mounted on a side of said circuit unit and engageable with said pair of second engagement sections;

a stop member extending between and continuous with said pair of second engagement sections spaced apart from and adjacent said holder, thereby forming an insertion space between said holder and said stop member, said insertion space adapted to permit said wire harness to extend therethrough to an exterior of said main unit without entering onto said mounting surface.

2. The connection box of claim 1 wherein said stop member is a flat plate.

3. The connection box of claim 1 wherein said stop member and said pair of second engagement sections on said mounting surface are of substantially equal height.

4. The connection box of claim 1 wherein there is a retaining section on said holder extending between said first attachment sections, thereby permitting passage of said wire harness over said retaining section.

5. The connection box of claim 4 wherein said retaining section has an offset section of lesser height than said first attachment sections, whereby passage of said wire harness over said offset section is facilitated.

6. The connection box of claim 4 wherein said retaining section is an arcuate section bowing away from said main unit, thereby providing said insertion space.

7. The connection box of claim 1 wherein a lower portion of said stop member is open.

8. An electrical connection box comprising a main unit, having a mounting surface thereon, a circuit unit having a bottom surface, said bottom surface being substantially complementary to said mounting surface, said circuit unit mounted on said main unit with said bottom surface facing said mounting surface, a holder, mounted on a side surface of said main unit adjacent said mounting surface by a plurality of first attachment sections, said first attachment sections engageable with a corresponding plurality of first engagement sections on said side surface of said main unit, said holder comprising a connector in electrical contact with a wire harness;

a pair of second engagement sections extending upward from said mounting surface and adjacent to said side surface of said main unit;

a pair of second attachment sections mounted on a side of said circuit unit and engageable with said pair of second engagement sections;

a stop member extending between and continuous with said pair of second engagement sections, spaced apart from and adjacent said holder, thereby forming an insertion space, said wire harness extending through said insertion space to an exterior of said main unit without entering onto said mounting surface.

9. The connection box of claim 8 wherein said stop member is a flat plate.

10. The connection box of claim 8 wherein said stop member and said pair of second engagement sections on said mounting surface are of substantially equal height.

11. The connection box of claim 8 wherein there is a retaining section on said holder extending between said first attachment sections, thereby permitting passage of said wire harness over said retaining section.

12. The connection box of claim 11 wherein said retaining section has an offset section of lesser height than said first attachment sections, whereby passage of said wire harness over said offset section is facilitated.

13. The connection box of claim 11 wherein said retaining section is an arcuate section bowing away from said main unit, thereby providing said insertion space.

14. The connection box of claim 8 wherein a lower portion of said stop member is open.

* * * * *